UNITED STATES PATENT OFFICE.

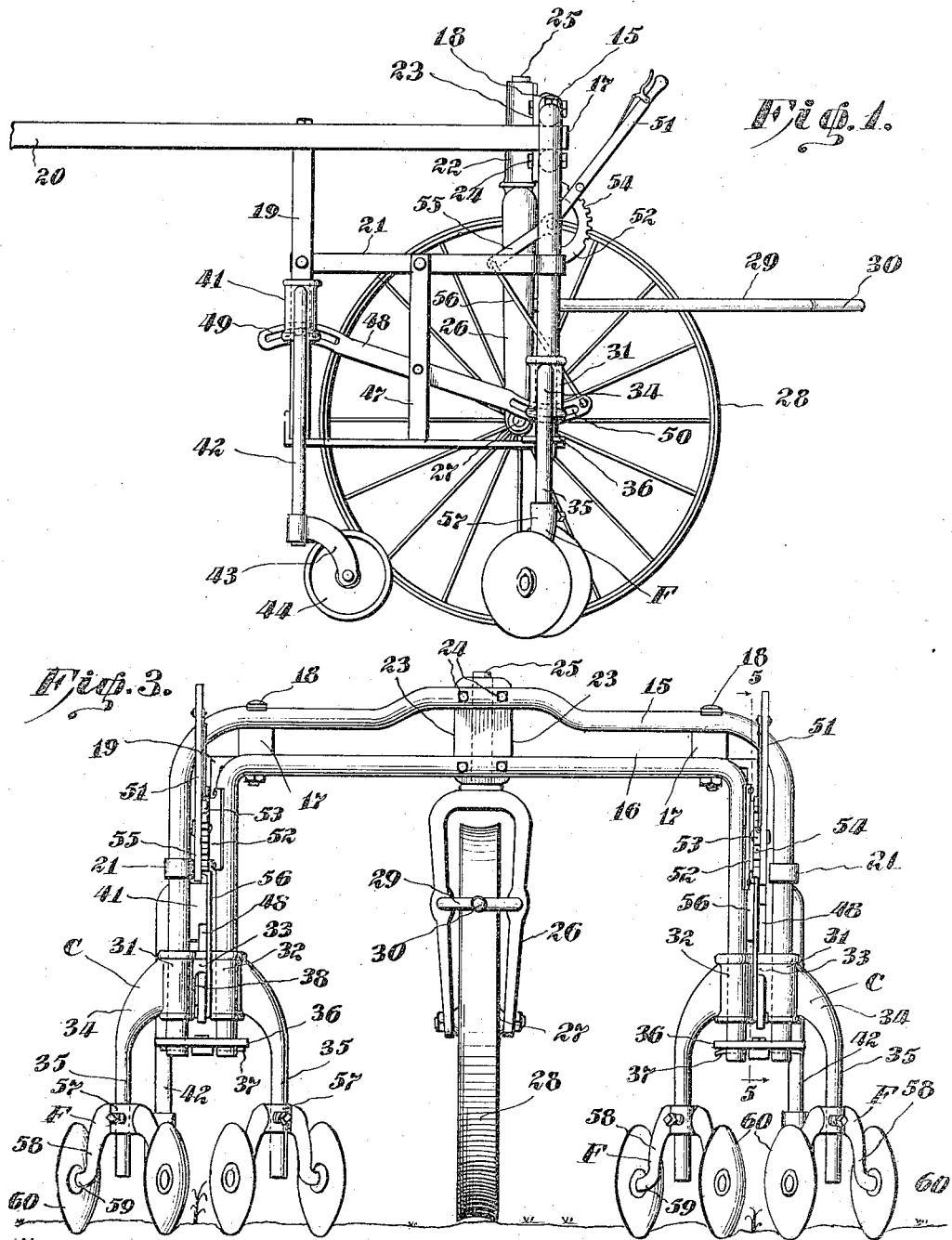

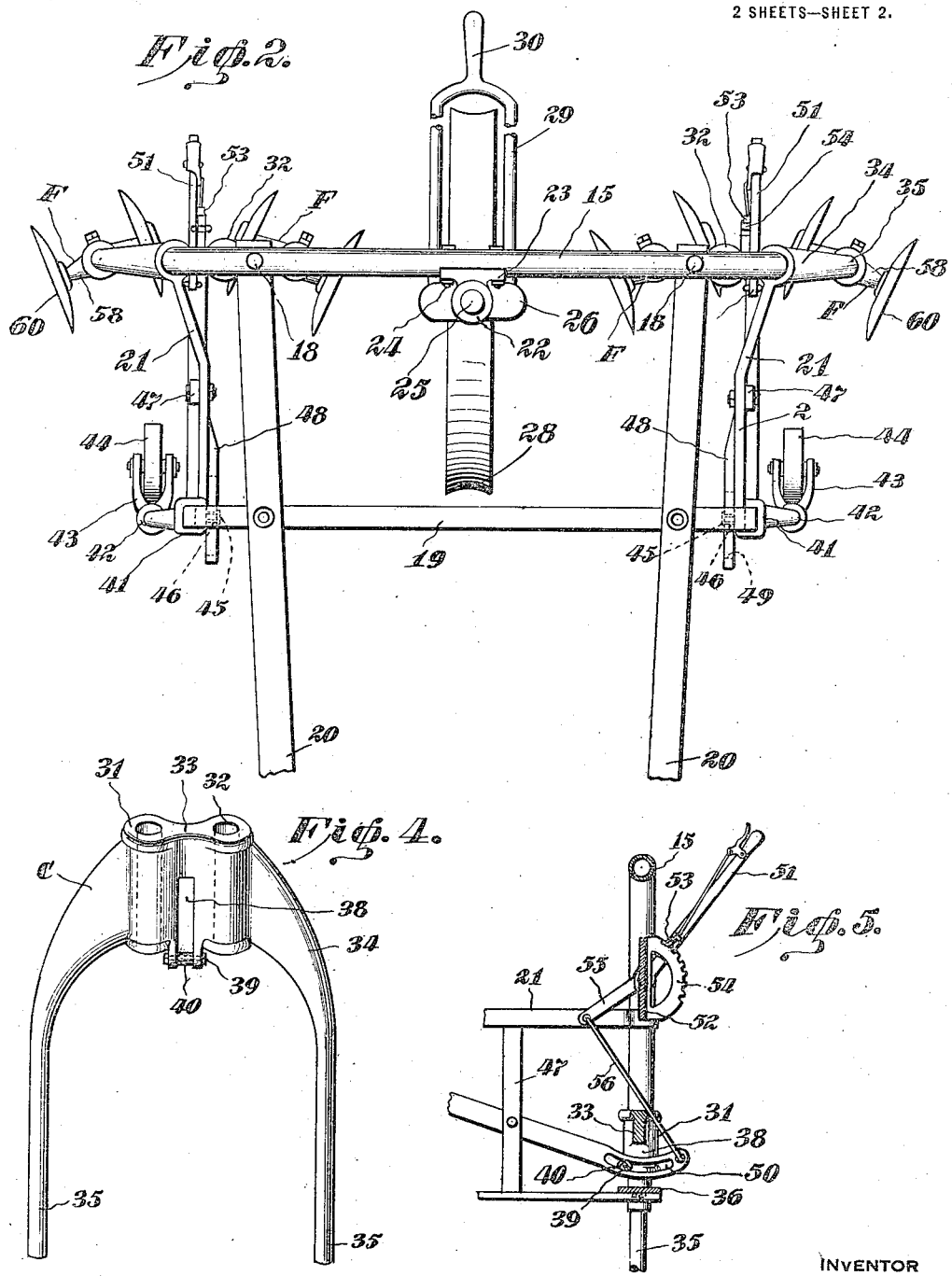

ALBERT O. CLARK, OF BRAZIL, INDIANA.

CORN-PLOW.

1,245,871. Specification of Letters Patent. Patented Nov. 6, 1917.

Application filed February 16, 1917. Serial No. 149,071.

*To all whom it may concern:*

Be it known that I, ALBERT O. CLARK, a citizen of the United States, residing at Brazil, in the county of Clay and State of Indiana, have invented new and useful Improvements in Corn-Plows, of which the following is a specification.

This invention relates to corn plows or cultivators and it has particular reference to a two row disk cultivator adapted for cultivating small and young corn up to the second or third plowing, the purpose being to cultivate the small corn quickly so as to eradicate weeds and the like at an early stage.

The invention has for its object to produce a simple, inexpensive and efficient plow for cultivating close to the rows of corn, the cultivator frame being supported mainly on a central wheel that travels between the rows which are being operated upon.

A further object of the invention is to produce a simple and improved cultivator which may be drawn by one horse and which is supported mainly on a centrally disposed wheel, the device being, however, provided with auxiliary ground engaging wheels for balancing the frame while being transported from place to place.

A further object of the invention is to produce a simple and improved cultivator having auxiliary ground engaging wheels mounted for vertical adjustment, and disk carrying forks also mounted for vertical adjustment in connection with adjusting means whereby the disks will be lowered when the auxiliary wheels are raised from the ground, and vice versa.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawings,

Figure 1 is a side elevation of a cultivator constructed in accordance with the invention.

Fig. 2 is a top plan view of the same.

Fig. 3 is a rear elevation.

Fig. 4 is a perspective detail view of one of the disk carrying forks.

Fig. 5 is a sectional detail view taken on the line 5—5 in Fig. 3.

Corresponding parts in the several figures are denoted by like characters of reference.

The frame of the improved cultivator includes an arch structure comprising an outer arch 15 and an inner arch 16, said inner arch being of relatively small dimensions as compared with the outer arch and the two arches being disposed in the same vertical plane, the inner arch being suitably spaced from the outer arch by means of spacing members 17 and connected therewith by bolts 18. The arches 15 and 16 may be made of tubular material in order to insure strength and lightness. The frame structure also includes a front arch 19 which is connected with and spaced from the main arch 15 by means of thills or shafts 20 and also by means of braces 21, said braces or connecting members being arranged in any convenient manner to insure strength and rigidity.

A sleeve 22, arranged midway between the limbs of the arch members 15, 16, is provided with flanges 23 for the passage of connecting members such as bolts, rivets or the like 24 whereby the said sleeve is secured in an upright or vertical position on the bridge portions of the arch members 15, 16. The sleeve 22 receives a shaft 25 having at its lower end a fork 26 the limbs of which afford bearings for the axle 27 of the ground wheel or transporting wheel 28. The limbs of the fork 26 are apertured for the passage of the limbs of a steering fork 29, the latter having a handle 30 whereby it may be manipulated for the purpose of steering the machine by the operator who walks behind.

C, see Fig. 4, is a casting comprising two sleeves 31, 32 that are connected together by a web 33, each sleeve having a laterally extending arm or bracket 34 provided with a downwardly extending prong 35, said prongs being substantially parallel to each other. The sleeves 31, 32 are arranged for slidable engagement with the limbs of the respective arches 15, 16, one casting C being provided for each pair of limbs. Mounted near the lower ends of the limbs of the arch members are plates 36 which are retained in position by cotter pins 37, said plates being designed to limit the downward movement of the castings C and to support said castings at the limits of their downward movements. The web 33 of each casting has a slot 38 which is bridged by a bolt 39 carrying an anti-friction member such as a roller 40.

Mounted on each limb of the yoke or arch 19 is a slide 41 having a downwardly extending arm 42 at the lower end of which is journaled a fork 43 carrying a caster wheel 44. Each slide 41 is equipped with a stud 45 carrying an antifriction member 46.

A vertically disposed brace member 47 which constitutes a part of the frame structure at each side of the latter carries a lever 48, one of said levers being arranged at each side of the frame. Each lever has forwardly and rearwardly extending arms, said arms being provided with slots 49, 50 engaging respectively the anti-friction members 46 of the slides 41 and the anti-friction members 40 of the castings C. It will be seen that by rocking the levers 48, the caster wheels 44 are raised and the castings C lowered or vice versa. For the purpose of effecting the desired adjustment of the levers 48 hand levers 51 are provided, each of said hand levers being fulcrumed on a lever stand 52 which is securely mounted on one of the limbs of the arch member 15. Each hand lever 51 is provided with a latch member 53 engaging a rack segment 54 on the lever stand on which it is mounted; each of said levers has a downwardly extending arm 55 which is connected by a connecting rod 56 with one of the levers 48, thus enabling said levers to be independently adjusted in the manner and for the purpose set forth.

Mounted on each prong 35 of each casting C is a fork F having a sleeve 57 that engages the prong 35 on which it may be secured in any convenient manner. Each prong 58 of the fork F has a spindle 59 on which a disk 60 is journaled in the customary manner. It will be readily understood that the disks may be arranged to throw the dirt either toward or from the row of plants that is to be operated upon; also, that by proper adjustment of the sleeve 57 on the prong 35 either the inner or the outer disk carried by the prong F may be arranged in advance of its mate, and that any other adjustments that may be called for by the exigencies of the case may be made as required.

From the foregoing description it will be seen that I have produced a very simple and inexpensive cultivator adapted to travel on the single ground wheel 28 between the rows of plants that are to be operated upon, and in which the disks may be readily adjusted so as to perform the desired operation of throwing the dirt toward or from the plants as may be desired. It will also be seen that when the device is in operation the auxiliary ground wheels or caster wheels 44 may be elevated an ample distance above the ground to avoid interference with the plants while on the other hand when the device is to be transported from place to place the caster wheels may be moved to ground engaging position while at the same time the disk carrying forks will be raised an ample distance from the ground to avoid engagement therewith.

Having thus described the invention, what is claimed as new is:

1. In a cultivator of the class described, a frame structure including two arch members disposed in the same vertical plane, suitably connected and spaced apart, castings each including a pair of sleeves engaging the proximate limbs of the two arch members, and disk carrying members carried by said castings.

2. In a cultivator of the class described, a pair of vertically disposed limbs, a casting having sleeves slidably engaging said limbs, said sleeves being connected together by a web and each sleeve having a lateral bracket provided with a downwardly extending prong, and disk carrying members carried by the prongs.

3. In a cultivator, a frame structure including spaced and connected rear arches arranged in the same vertical plane, a front arch, shafts and braces connecting the front arch with the outer rear arch, disk carrying castings slidable on the limbs of the rear arches, said casting having anti-friction members, slides movable on the limbs of the front arch and having caster wheels connected therewith, said slides having anti-friction members, levers having slots engaging the anti-friction members of the castings and the slides, and means for actuating the levers and for securing the same at various adjustments.

4. In a cultivator, a frame structure including outer and inner arch members spaced and connected together and arranged in the same vertical plane, disk supporting elements carried by the limbs of the arches, each element engaging a limb of each arch, a sleeve secured on the bridge portions of the arches, a shaft journaled in said sleeve having a downwardly extending fork, and a ground wheel journaled in said fork.

5. In a cultivator, a frame structure including outer and inner arch members spaced and connected together and arranged in the same vertical plane, disk supporting elements carried by the limbs of the arches, each element engaging a limb of each arch, a sleeve secured on the bridge portions of the arches, a shaft journaled in said sleeve having a downwardly extending fork, and a ground wheel journaled in said fork; in combination with a steering fork the limbs of which engage and are securely connected with the limbs of the wheel carrying fork.

In testimony whereof I affix my signature.

ALBERT O. CLARK.

Copies of this patent may be obtained for five cents each, by addressing the "Commissioner of Patents, Washington, D. C."